P. F. AUGENBRAUN.
CLOSURE FOR GASOLENE OR OTHER LIQUID TANKS.
APPLICATION FILED JULY 1, 1915.
1,212,878.
Patented Jan. 16, 1917.
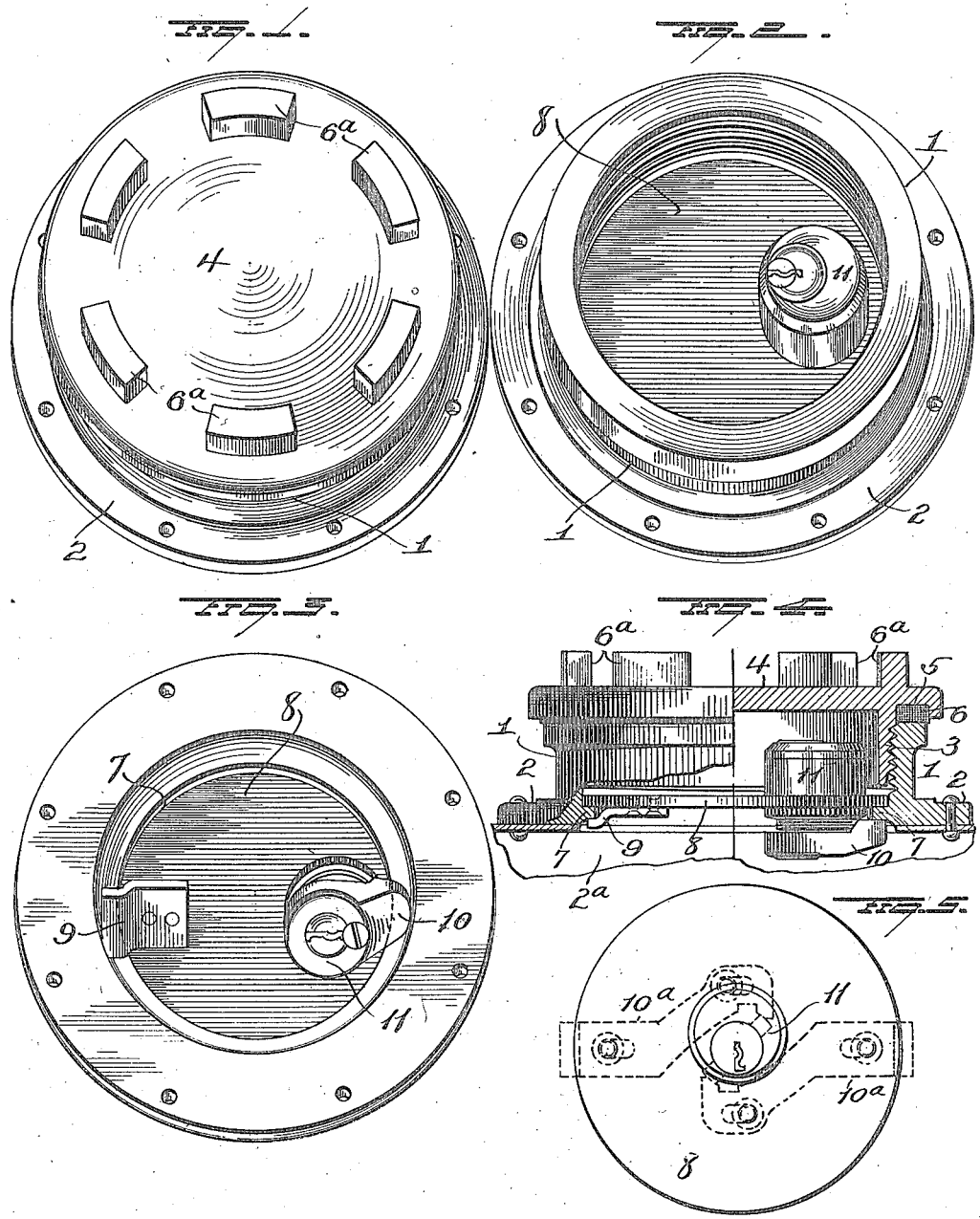

UNITED STATES PATENT OFFICE.

PETER F. AUGENBRAUN, OF STAMFORD, CONNECTICUT, ASSIGNOR TO THE YALE & TOWNE MANUFACTURING COMPANY, OF STAMFORD, CONNECTICUT.

CLOSURE FOR GASOLENE OR OTHER LIQUID TANKS.

1,212,878.      Specification of Letters Patent.      Patented Jan. 16, 1917.

Application filed July 1, 1915. Serial No. 37,614.

*To all whom it may concern:*

Be it known that I, PETER F. AUGENBRAUN, a citizen of the United States, and a resident of Stamford, in the county of Fairfield and State of Connecticut, have invented certain new and useful Improvements in Closures for Gasolene or other Liquid Tanks; and I do hereby declare the following to be a full, clear, and exact description of the invention, such as will enable others skilled in the art to which it appertains to make and use the same.

My invention relates to an improvement in closures for gasolene or other liquid tanks, and it consists of a ring having an internal annular lip, a threaded cap for said ring and an independent closure below the cap and provided with lock actuated bolt for locking the closure to the annular lip, whereby access to the interior of the tank is prevented except by the use of the proper key.

In the accompanying drawings, Figure 1 is a view of my improvement showing the cap in place; Fig. 2 is a bottom view of the same; Fig. 3 is a view in section; Fig. 4 is a top view with the cap removed showing the cover plate in position, and Fig. 5 is a view similar to Fig. 2 of a modification.

1 represents a flanged ring, the flange 2 of which is adapted to be attached to a gasolene or other tank 2ª around the inlet opening in the latter. This ring 1 is threaded internally to engage threads on the circular flange 3 of the cap 4, which latter is provided exteriorly of the flange 3, with recess 5 extending around the cap to receive the packing ring or gasket 6 which, when the cap is screwed home, rests on the outer edge of ring 1 and forms an air tight closure for the tank. This cap 4 is also provided on its surface with a series of integral lugs 6ª which form supports or abutments for the lever employed in screwing and unscrewing the cap.

The ring 1 is also provided interiorly adjacent its inner edge, with an annular lip 7, which is continuous around the ring and forms a seat or support for the closure plate 8. This plate is circular in form and flat, and rests within the ring 1 below the cap 4. It is provided on its lower face with a rigid clamp 9 which is adapted to take under the annular lip 7, and also with a bolt 10 which is actuated by a lock 11 carried by the plate.

I have shown the bolt 10 secured to the key plug of a pin tumbler lock 11, which plug may be turned to carry the bolt under the lip 7, and lock it there, thus locking the closure plate in position, or be turned in the opposite direction to release the plate thus permitting the latter to be removed.

In the construction shown in Fig. 5, I have dispensed with the rigid clamp 9, and shown a lock having two bolts 10ª both of which are actuated to lock and release the closure plate.

In the drawings I have shown a cap such as is used on many of the gasolene tanks for automobile or gasolene engines, where the gasolene is forced through the carbureter under pressure, but the particular construction of flanged ring, cap or tank is not material to the invention and may be modified as found necessary or desirable.

It will be seen that when the closure plate 8 is in position with its fixed clamp under the lip, and the movable bolt 10 turned to its locking position as shown in Fig. 2, no unauthorized access can be had to the tank either to remove the gasolene or other liquid, or put any objectionable matter into the gasolene which is sometimes done.

Most of the tanks for gasolene engines are provided with an intake opening which is closed by a cap fastened in place by screw-thread or other preferred means, and many of these caps must be air-tight, when the gasolene is fed under pressure. In view of the construction of these caps it is not easy to attach a lock directly to them, and therefore, my device is made independent of the cap. It is designed for attachment to any tank without changing the construction of the latter and when used will absolutely prevent the theft of the gasolene, or the introduction of any objectionable matter into the tank.

Having fully described my invention what I claim as new and desire to secure by Letters-Patent, is:—

1. The combination of a ring having an internal annular lip, a closure plate seated on the lip, a lock actuated bolt for locking said plate to the lip, and a readily detachable cap secured to the outer end of the ring for sealing the same and also for concealing the closure plate and its lock.

2. The combination of a ring having an internal annular lip, a closure plate resting on said lip, a lock actuated bolt for locking said plate to the lip, and a readily detachable air tight cap secured to the ring for sealing the same and also for concealing the closure plate and its lock.

3. The combination of a ring having an internal annular lip, a closure plate resting on said lip and provided with a rigid clamp and a movable bolt coacting with the clamp to lock the closure plate in place, a lock carried by said plate for actuating the bolt and a freely detachable cover secured to the upper end of the ring and hermetically sealing the same.

4. The combination of a tank having an intake opening, a readily removable cap for hermetically sealing said opening and an independent closure for said opening comprising a plate, a bolt for locking said plate within the opening and a lock for actuating the bolt, the said closure and lock being concealed by the cap.

In testimony whereof, I have signed this specification in the presence of two subscribing witnesses.

PETER F. AUGENBRAUN.

Witnesses:
SCHUYLER MERRITT,
WILLIAM P. MOSELY.